US012809635B2

(12) United States Patent
Wang et al.

(10) Patent No.: US 12,809,635 B2
(45) Date of Patent: Nov. 24, 2026

(54) PREFETCHING SYSTEM AND METHOD FOR A FILE SYSTEM IN USER SPACE

(71) Applicant: VIA Technologies, Inc., Taipei (TW)

(72) Inventors: Yaote Wang, Taipei (TW); Chun-Hua Tseng, Taipei (TW)

(73) Assignee: VIA TECHNOLOGIES, INC., Taipei (TW)

( * ) Notice: Subject to any disclaimer, the term of this patent is extended or adjusted under 35 U.S.C. 154(b) by 0 days.

(21) Appl. No.: 18/656,841

(22) Filed: May 7, 2024

(65) Prior Publication Data

US 2025/0147768 A1 May 8, 2025

(30) Foreign Application Priority Data

Nov. 7, 2023 (TW) ................................ 112142745

(51) Int. Cl.
*G06F 9/38* (2018.01)

(52) U.S. Cl.
CPC ............ *G06F 9/383* (2013.01); *G06F 9/3814* (2013.01)

(58) Field of Classification Search
CPC ...... G06F 9/383; G06F 9/3814; G06F 16/172; G06F 12/0871; G06F 16/51; G06F 16/71
See application file for complete search history.

(56) References Cited

U.S. PATENT DOCUMENTS

2021/0081372 A1* 3/2021 Lee ....................... G06F 9/4411
2023/0041067 A1* 2/2023 Fruchtman .............. H03M 7/40

FOREIGN PATENT DOCUMENTS

CN 110471894 A * 11/2019
TW 201640378 A 11/2016
WO WO-2016090985 A1 * 6/2016 ............ G06F 12/08

OTHER PUBLICATIONS

R. Andersen and B. Vinter, “Transparent remote file access in the minimum intrusion grid,” 14th IEEE International Workshops on Enabling Technologies: Infrastructure for Collaborative Enterprise (WETICE’05), Linköping, Sweden, 2005, pp. 311-316 (Section 3.6), doi: 10.1109/WETICE.2005.59. (Year: 2005).*

* cited by examiner

*Primary Examiner* — Rocio Del Mar Perez-Velez
(74) *Attorney, Agent, or Firm* — McClure, Qualey & Rodack, LLP

(57) ABSTRACT

A data system and a data reading method are provided in the present disclosure. The data system includes a processor, a memory, and a storage device. The processor includes a file system in user space. The memory includes a memory buffer. The user file space system receives a reading request sent by an application end. The file system in user space reads prefetch data of a target file pre-stored in at least one buffer block of the memory buffer according to the reading request. In response to the file system in user space determining that a total reading amount of a last buffer block with stored data from the at least one buffer block being currently read exceeds a preset total amount, the file system in user space prefetches a next batch of prefetch data of the target file from the storage device and stores it in another buffer block. Therefore a data reading operation of high efficiency is achieved.

18 Claims, 9 Drawing Sheets

PREFETCHING SYSTEM AND METHOD FOR A FILE SYSTEM IN USER SPACE

CROSS-REFERENCE TO RELATED APPLICATIONS

This application claims the priority benefit of Taiwan application serial no. 112142745, filed on Nov. 7, 2023. The entirety of the above-mentioned patent applications are hereby incorporated by reference herein and made a part of this specification.

TECHNICAL FIELD

The present disclosure relates to a data reading technology and in particular to a data system and a data reading method.

BACKGROUND

Generally data reading refers to reading a file from a storage device (e.g., a hard disk) by an operating system (OS). However, conventional data reading methods take relatively long time for data transfer. In addition, when a plurality of data reading requests correspond to data of a same file, a conventional system reads the data of this file repeatedly from the storage device, therefore the time spent on data reading is increased.

SUMMARY

The present disclosure provides a data system and a data reading method allowing data reading operations of high efficiency.

The data system according to the present disclosure comprises a processor, a memory, and a storage device. The processor comprises a file system in user space. The memory comprises a memory buffer and is electrically coupled to the processor. The storage device is electrically coupled to the processor and the memory. The file system in user space receives a reading request sent by an application end; and the file system in user space reads, based on the read request, prefetch data of a target file which is pre-stored in at least one buffer block of the memory buffer. In response to the file system in user space determining that a total reading amount for a last buffer block with stored data from the at least one buffer block being currently read exceeds a preset total amount, the file system in user space prefetches a next batch of prefetch data of the target file from the storage device and stores it in another buffer block.

The data reading method according to the present disclosure comprises: receiving, by a file system in user space, a reading request sent by an application end; reading, based on the reading request and by the file system in user space, prefetch data of a target file pre-stored in at least one buffer block of a memory buffer; and in response to the file system in user space determining that a total reading amount for a last buffer block with stored data from the at least one buffer block being currently read exceeds a preset total amount, prefetching, by the file system in user space, a next batch of prefetch data of the target file from a storage device, and storing it in another buffer block.

On this basis, by the data system and the data reading method of the present disclosure, it is possible to establish buffer blocks in a memory buffer by a file system in user space based on a reading request for prefetching data of a target file, thereby effectively improving the data reading speed.

To make the above features and advantages of the present disclosure obvious and understandable, exemplary embodiments are described subsequently in details with reference to the drawings.

Figure 1:
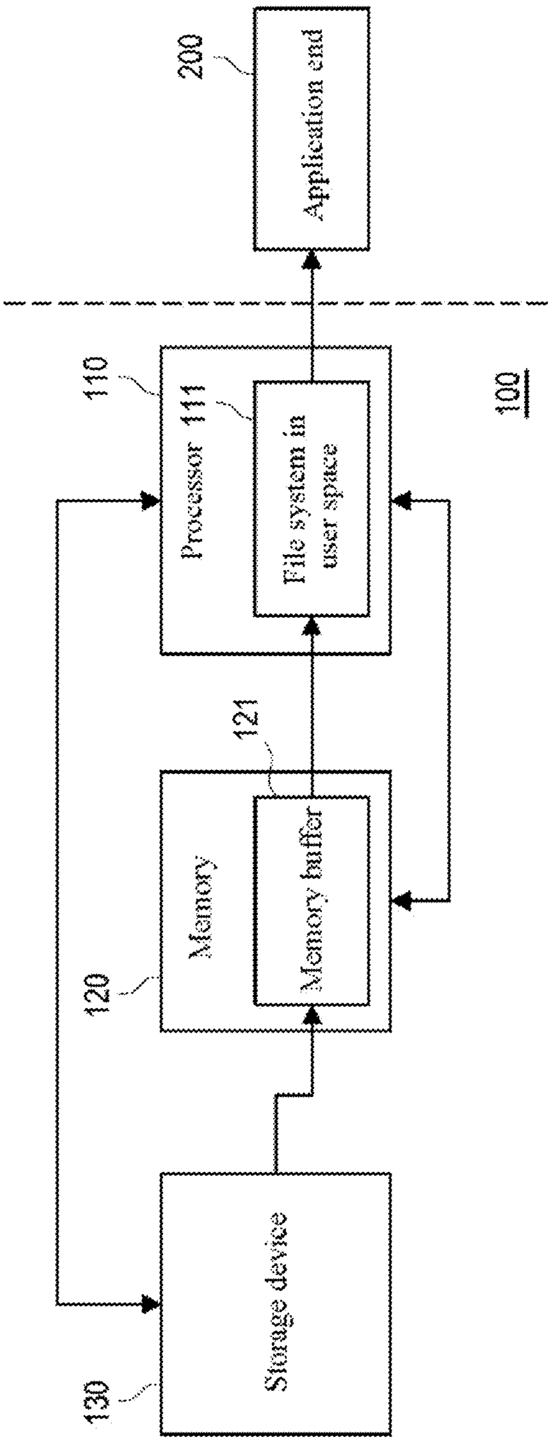
FIG. 1 is a schematic diagram of the data system according to an embodiment of the present disclosure.

Numerical reference in the drawings are briefly explained below:

100: data system; 110: processor; 111: file system in user space; 120: memory; 121: memory buffer; 130: storage device; 200: application end; 301, 401, 601, 701, 801, 901: range for reading; 310 to 330, 410 to 440, 510 to 580, 610 to 640, 710 to 730, 810 to 830, 910 to 940: buffer blocks; S210 to S230: steps.

DETAILED DESCRIPTION

In order to make the contents of the present disclosure easy to understand, embodiments are provided below as practical examples of implementation of the present disclosure. In addition, as far as possible, the elements/components/steps indicated by the same numerical references in the drawings and the embodiments represent the same or similar components.

FIG. 1 is a schematic diagram of the data system according to an embodiment of the present disclosure. Referring to FIG. 1, the data system 100 comprises a processor 110, a memory 120, and a storage device 130. The processor 110 is coupled to the memory 120 and the storage device 130. The processor 110 comprises the file system in user space (FUSE) 111. The memory 120 comprises the memory buffer 121. In this embodiment, the processor 110 may include a system on a chip (SOC), or may include, for example, a central processing unit (CPU) or other general-purpose or dedicated programmable microprocessors, a digital signal processor (DSP), a programmable controller, an application specific integrated circuit (ASIC), a programmable logic device (PLD), other similar processing devices, or a combination thereof. In this embodiment, the memory 120 may be, for example, a dynamic random access memory (DRAM). The storage device 130 may be, for example, a hard disk or a cluster system consisting of multiple hard disks. In this embodiment, the data system 100 may be implemented as, for example, a cloud server or a cloud data storage system, and the present disclosure is not limited hereto. In this embodiment, the application end 200 may be, for example, an application external or internal of the system, or an external terminal device, and may send to the processor 110 a reading request for data (e.g., sequential video data) to allow the file system in user space 111 to read the storage device 130 based on the reading request.

In this embodiment, the processor 110 may receive the reading request from the application end 200, and the file system in user space 111 may set the memory 120 based on the reading request to build in the memory buffer 121 at least one buffer block corresponding to a target file of the reading request. Correspondingly, data of the target file (a portion corresponding to the current reading request) stored in the storage device 130 can be read and stored in the at least one buffer block, allowing the file system in user space 111 to read data corresponding to the reading request from the at least one buffer block.

Figure 2:
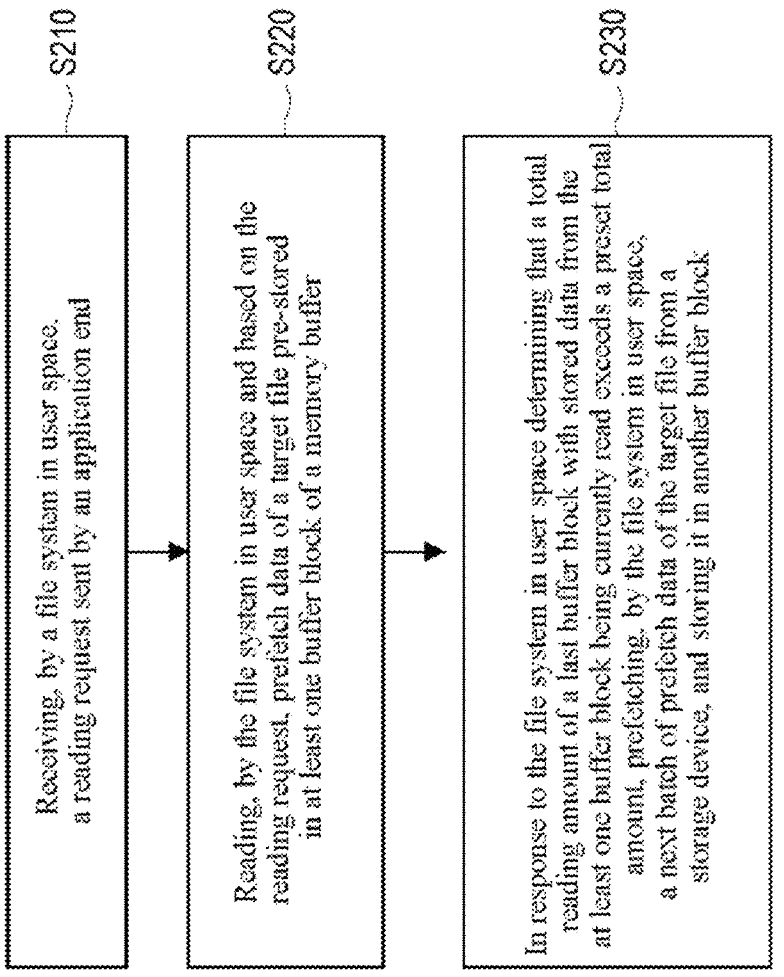
FIG. 2 is a flow chart of the data reading method according to an embodiment of the present disclosure.

FIG. 2 is a flow chart of the data reading method according to an embodiment of the present disclosure. Referring to FIG. 2, the data system 100 may execute the following steps S210 to S230. In step S210, the file system in user space 111 may receive the reading request sent by the application end 200. In step S220, the file system in user space 111 may read prefetched data of the target file that is pre-stored in at least one buffer block of the memory buffer 121 based on the reading request. In this embodiment, assuming that the reading request is the first-time request for reading the target file, the file system in user space 111 may build at least one buffer block corresponding to the target file based on reading request.

For instance, if the data amount of the reading request is less than 512 KB, the file system in user space 111 may build a first buffer block (with buffer size of for example 512 KB) in the memory buffer 121 based on a read offset, and read the corresponding data from the storage device 130 and store it in the first buffer block.

For another instance, if the data amount of the reading request is less than 1.5 MB, the file system in user space 111 may build a first buffer block (with buffer size of for example 512 KB) and a second buffer block (with buffer size of for example 1 MB) in the memory buffer 121 based on a read offset, and read sequential data from the storage device 130 and store it in the first buffer block and the second buffer block. After the reading of data is finished, the file system in user space 111 may return the data in the buffer blocks to the application end 200 with given space locations of the memory buffer 121.

In this embodiment, buffer sizes of at least one initially built portion of multiple buffer blocks built by the file system in user space 111 based on the target file may increase sequentially. In an embodiment, the buffer sizes may increase sequentially for example by an arithmetic progression (i.e., 512 KB, 1 MB, 1.5 MB, 2 MB, 2.5 MB, 3 MB, 3.5 MB . . . , etc.). In this embodiment, the number of buffer blocks built by the file system in user space 111 based on the target file may have an upper limit, e.g., 7. Furthermore, in an embodiment, the total buffer size for the buffer blocks built by the file system in user space 111 based on the target file may also have an upper limit buffer size, e.g., 15 MB. The maximum buffer size of the buffer block may be, for example, 3.5 MB.

Furthermore, in an embodiment, in response to the file system in user space 111 receiving the first-time reading request sent by the application end 200, the file system in user space 111 may pre-store file data of an initial part of the target file in the first buffer block of the memory buffer 121 based on the first-time reading request, and pre-store (prefetch) file data of a final part of the target file in an additional buffer block of the memory buffer 121. As such, during the reading of some specific target files (e.g., video files), in response to a case where the file system in user space 111 reads file data of the final part of the target file unexpectedly during the data reading, the method may still maintain the data reading efficiency (without the need of rebuilding the buffer blocks). In an embodiment, the additional buffer block of the memory buffer 121 will not be recycled by the file system in user space 111 due to the number of buffer blocks reaching the upper limit (described subsequently), in response to a case where the file data of the final part of the target file needs to be read repeatedly during the data reading, such as in cases where metadata at the beginning and the end of a video file may need to be read repeatedly during the execution of a video playing or editing software.

In step S230, in response to the file system in user space 111 determining that a total reading amount for the last buffer block with stored data from the at least one buffer block being currently read exceeds a preset total amount, the file system in user space 111 may prefetch a next batch of prefetched data of the target file from a storage device 130 and store it in another buffer block.

Figure 3:
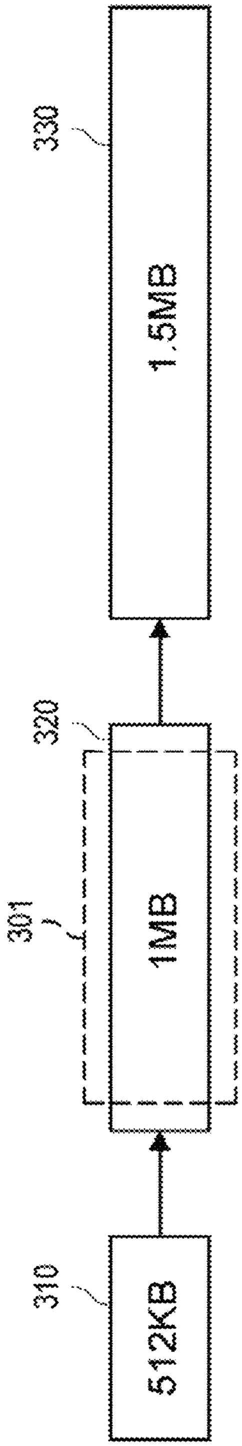
FIG. 3 is a schematic diagram of the buffer block of an exemplary embodiment of the present disclosure.

For instance, referring to FIG. 1 and FIG. 3, FIG. 3 is a schematic diagram of the buffer block of an exemplary embodiment of the present disclosure. The memory buffer 121 may include buffer blocks 310 to 330, for example. The buffer size of the buffer block 310 may be 512 KB. The buffer size of the buffer block 320 may be 1 MB. The buffer size of the buffer block 330 may be 1.5 MB. Assuming that a read range 301 (or the read offset) of the current reading request corresponds to data in the buffer block 320, the file system in user space 111 may determine that next time the application end 200 may continue to read the data in the buffer block 330; since the prefetched data exists in the buffer block 330, currently the memory 120 does not need to prefetch data.

Figure 4:
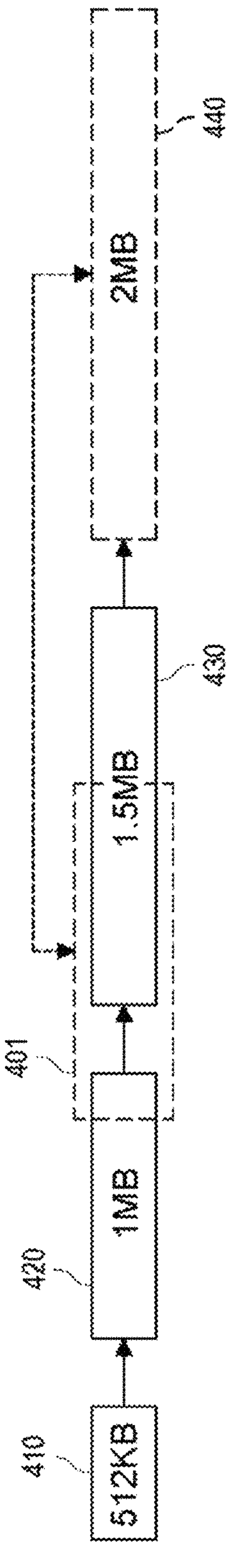
FIG. 4 is a schematic diagram of the buffer block of an exemplary embodiment of the present disclosure.

For another instance, referring to FIG. 1 and FIG. 4, FIG. 4 is a schematic diagram of the buffer block of an exemplary embodiment of the present disclosure. The memory buffer 121 may include buffer blocks 410 to 430, for example. The buffer size of the buffer block 410 may be 512 KB. The buffer size of the buffer block 420 may be 1 MB. The buffer size of the 430 may be 1.5 MB. Assuming that the read range 401 of the current reading request corresponds to data in the buffer block 430, the file system in user space 111 may determine that next time the application end 200 may continue to read data in a next buffer block 440 that has not been built yet. Also, the total reading amount for the buffer block 430 exceeds the preset total amount, indicating that subsequently the system may perform an operation for sequential reading; accordingly, the prefetch operation is activated. The memory 120 will build the buffer block 440 in the memory buffer 121, and prefetch a next batch of prefetched data (subsequent sequential data). To this end, the preset total amount may be half of the buffer size of the buffer block 430 with stored data (i.e., 0.75 MB=1.5 MB/2). In addition, the prefetched data in the buffer block 430 and the prefetched data in the buffer block 440 are sequential data. The prefetched data in the buffer blocks 410 to 440 are sequential data belonging to the same target file.

Figure 5:
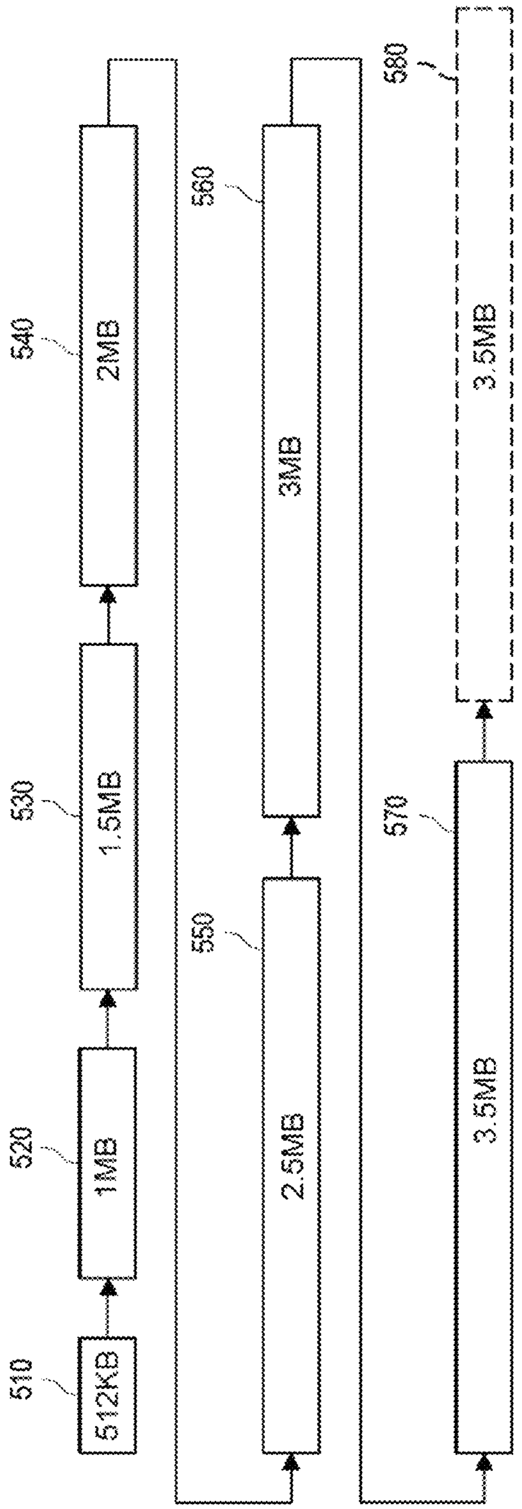
FIG. 5 is a schematic diagram of the buffer block of an exemplary embodiment of the present disclosure.

FIG. 5 is a schematic diagram of the buffer block of an exemplary embodiment of the present disclosure. Referring to FIG. 1 and FIG. 5, in an exemplary embodiment of the present disclosure, the memory buffer 121 may include buffer blocks 510 to 570 that have been built, for example.

The buffer size of the buffer block 510 may be 512 KB. The buffer size of the buffer block 520 may be 1 MB. The buffer size of the buffer block 530 may be 1.5 MB. The buffer size of the buffer block 540 may be 2 MB. The buffer size of the buffer block 550 may be 2.5 MB. The buffer size of the buffer block 560 may be 3 MB. The buffer size of the buffer block 570 may be 3.5 MB.

In response to the file system in user space 111 having prefetched the next batch of prefetched data of the target file from the storage device 130, and the number of buffer blocks reaching the upper limit, the file system in user space 111 may add a new buffer block 580 in the memory buffer 121, and start to recycle from the existing first buffer block (e.g., recycle the buffer blocks 510 to 540). To this end, assuming that the upper limit for the number of buffer blocks built by the file system in user space 111 based on the target file is 7, if the file system in user space 111 is about to add the next buffer block 580, since the maximum buffer size is 3.5 MB for example, the buffer size of each of the newly added buffer block 580 and the subsequently added buffer blocks may be kept to 3.5 MB as well. Meanwhile, the file system in user space 111 will start to recycle in sequence from the first buffer block 510 initially built. Furthermore, if the upper limit buffer size for the total buffer size is 15 MB, eventually the number of all the buffer blocks will be kept to 4 (each having a buffer size of 3.5 MB).

However, since the file system in user space 111 may receive another reading request sent by another application end, and the file system in user space 111 may use at least one of the buffer blocks 510 to 570 in the same manner based on another reading request, the buffer blocks 510 to 570 may be designed with a counter respectively to calculate a count value. The count value for a buffer block may be determined based on the number of reading operations on buffer block being currently read. In other words, if data in the buffer block 510 is currently read based on another reading request or by another application end, the count value may be 1. If data in the buffer block 510 is currently read based on three reading requests or by three another application ends, the count value may be 3. Accordingly, in response to a count value for a buffer block to be recycled being 0, the file system in user space 111 recycles this buffer block to be recycled. Otherwise, in response to a count value for the buffer block to be recycled not being 0, the file system in user space 111 suspend the recycling of this buffer block to be recycled.

Figure 6:
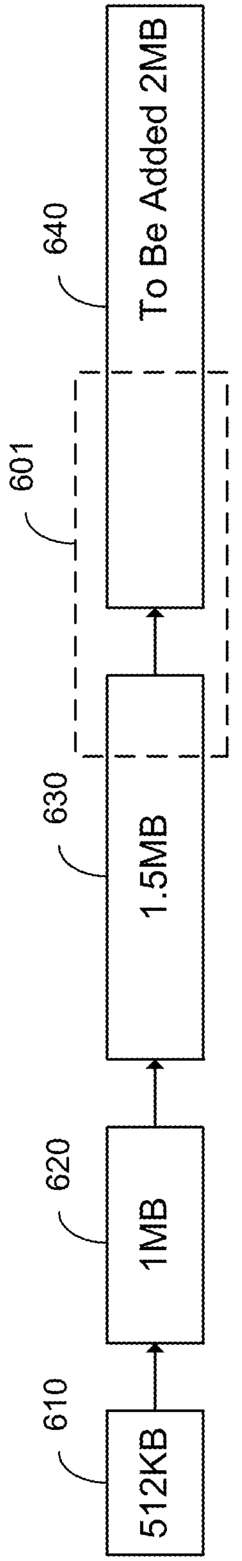
FIG. 6 is a schematic diagram of the buffer block of an exemplary embodiment of the present disclosure.

FIG. 6 is a schematic diagram of the buffer block of an exemplary embodiment of the present disclosure. Referring to FIG. 1 and FIG. 6, in an exemplary embodiment of the present disclosure, the memory buffer 121 may include buffer blocks 610 to 630 that have been built, for example. The buffer size of the buffer block 610 may be 512 KB. The buffer size of the buffer block 620 may be 1 MB. The buffer size of the buffer block 630 may be 1.5 MB. Assuming that the read range 601 of the current reading request corresponds to a part of data in the buffer block 630 and a part of data of the buffer block 640 that has not been loaded (to be loaded of 2 MB), the file system in user space 111 may continue to build the buffer block 640 and read a next batch of data (subsequent sequential data) of the target file from the storage device 130 to the buffer block 640. The amount of the read data is the buffer size of the buffer block 640 (2 MB).

Figure 7:
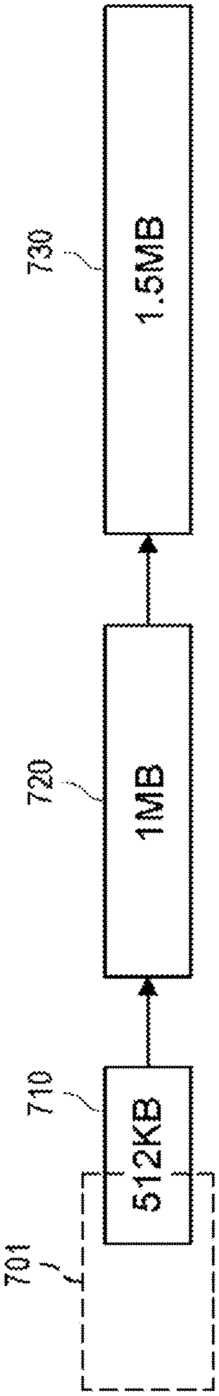
FIG. 7 is a schematic diagram of the buffer block of an exemplary embodiment of the present disclosure.

FIG. 7 is a schematic diagram of the buffer block of an exemplary embodiment of the present disclosure. Referring to FIG. 1 and FIG. 7, in an exemplary embodiment of the present disclosure, the memory buffer 121 may include buffer blocks 710 to 730 that have been built, for example. The buffer size of the buffer block 710 may be 512 KB. The buffer size of the buffer block 720 may be 1 MB. The buffer size of the buffer block 730 may be 1.5 MB. Assuming that the read range 701 of the current reading request corresponds to a part of data in the buffer block 710 and data not in the buffer blocks 710 to 730, the file system in user space 111 may determine that there is no hit, and the file system in user space 111 will clear the data in the memory buffer 121, i.e., recycle the buffer blocks 710 to 730. Correspondingly, the file system in user space 111 will rebuild new buffer blocks (e.g., build starting from a buffer block having a buffer size of 512 KB).

Figure 8:
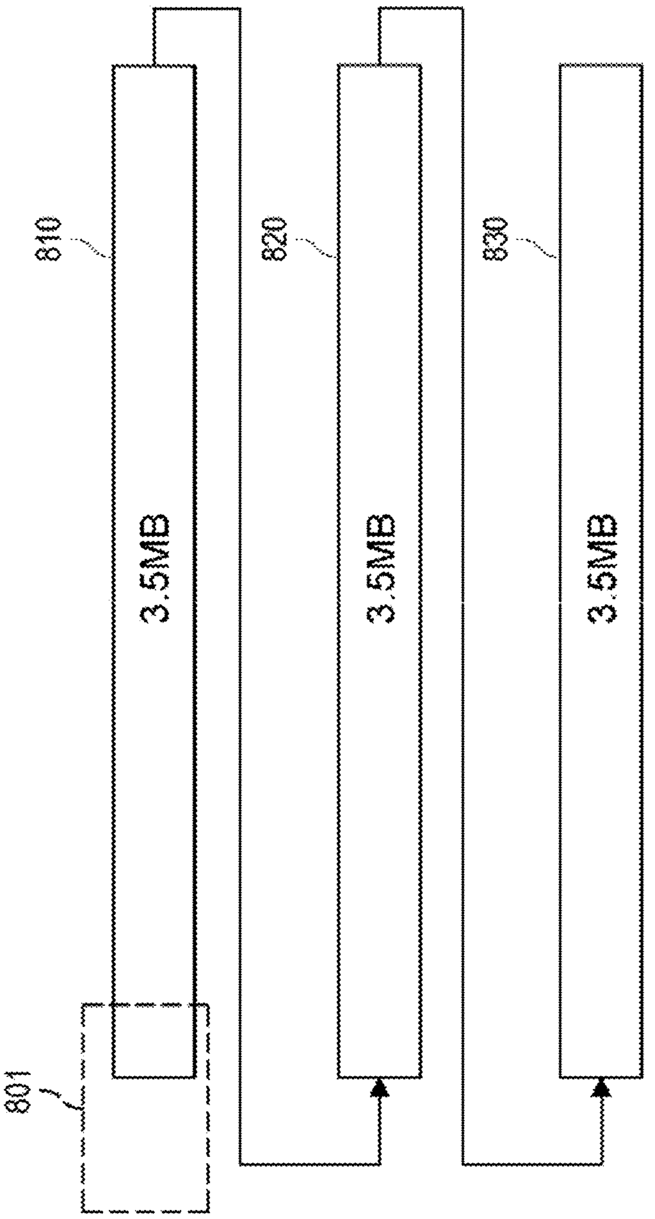
FIG. 8 is a schematic diagram of the buffer block of an exemplary embodiment of the present disclosure.

FIG. 8 is a schematic diagram of the buffer block of an exemplary embodiment of the present disclosure. Referring to FIG. 1 and FIG. 8, in an exemplary embodiment of the present disclosure, the memory buffer 121 may include the buffer block 810 to 830 that have been built, for example. The buffer blocks 810 to 830 may all have a buffer size of 3.5 MB. Assuming that the read range 801 of the current reading request corresponds to a part of data in the buffer block 810 and a part of data in a buffer block that had been previously unloaded (released), the file system in user space 111 may determine that there is no hit, and the file system in user space 111 will clear the data in the memory buffer 121, i.e., recycle the buffer blocks 810 to 830. Correspondingly, the file system in user space 111 will rebuild new buffer blocks (e.g., build starting from a buffer block having a buffer size of 512 KB).

Figure 9:
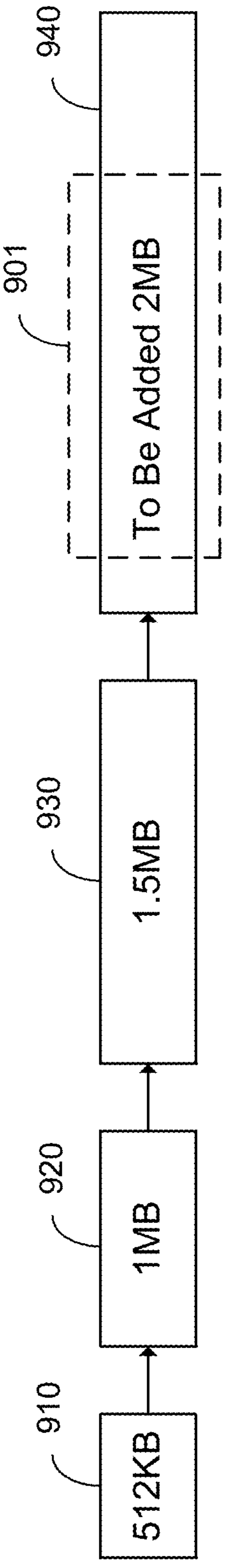
FIG. 9 is a schematic diagram of the buffer block of an exemplary embodiment of the present disclosure.

FIG. 9 is a schematic diagram of the buffer block of an exemplary embodiment of the present disclosure. Referring to FIG. 1 and FIG. 9, in an exemplary embodiment of the present disclosure, the memory buffer 121 may include buffer blocks 910 to 930 that have been built, for example. The buffer size of the buffer block 910 may be 512 KB. The buffer size of the buffer block 920 may be 1 MB. The buffer size of the buffer block 930 may be 1.5 MB. Assuming that the read range 901 of the current reading request corresponds to data not in the buffer blocks 910 to 930 but in, e.g., data in a next buffer block 940 that has not been loaded (to be loaded of 2 MB), the file system in user space 111 may determine that there is no hit, and the file system in user space 111 will clear the data in the memory buffer 121, i.e., recycle the buffer blocks 910 to 930. Correspondingly, the file system in user space 111 will rebuild new buffer blocks (e.g., build starting from a buffer block having the buffer size of 512 KB).

In sum, by the data system and the data reading method of the present disclosure, buffer blocks can be built by the file system in user space to build in the memory buffer based on a reading request; the buffer blocks can be added and recycled dynamically based on the reading condition, and multiple reading requests can be supported to use same buffer blocks. Therefore, the data system and the data reading method of the present disclosure can effectively prefetch data of a target file to the memory buffer, so that the file system in user space can rapidly read the corresponding sequential data to the application end based on the reading request.

The above descriptions are only preferred embodiments of the present disclosure, but are not intended to limit the scope of the present disclosure. Anyone skilled in the art can make further improvements and modifications on this basis without departing from the spirit and scope of the present disclosure. Therefore, the scope of protection of the present disclosure shall be interpreted based on the scope defined by the claims of the present application.

What is claimed is:

1. An electronic data system, comprising:

a processor circuit comprising a file system in user space;

a non-cache memory circuit comprising a memory buffer and electrically coupled to the processor; and a storage device electrically coupled to the processor and the memory, wherein the file system in user space receives a reading request sent by an application end, and the file system in user space reads prefetch data of a target file pre-stored in at least one buffer block of the memory buffer based on the reading request, wherein in response to the file system in user space determining that a total amount of data read from a last buffer block combined with stored data from the at least one buffer block being currently read exceeds a preset total amount, the file system in user space prefetches a next batch of prefetch data of the target file from the storage device and stores the next batch of prefetch data in another buffer block of the memory buffer;

wherein sizes of buffer blocks included in at least one initially built portion of a plurality of buffer blocks built by the file system in user space based on the target file sequentially increase.

2. The data system according to claim 1, wherein the preset total amount is half of a buffer size of the last buffer block with stored data from the at least one buffer block.

3. The data system according to claim 1, wherein the prefetch data and the next batch of prefetch data are sequential data.

4. The data system according to claim 1, wherein the sizes of buffer blocks included in the at least an initially built portion of the plurality of the buffer blocks built by the file system in user space based on the target file sequentially increase by an arithmetic progression.

5. The data system according to claim 1, wherein in response to the file system in user space having prefetched the next batch of prefetch data of the target file from the storage device, and a number of a plurality of buffer blocks built by the file system in user space based on the target file having reached an upper limit, the file system in user space adds a new buffer block in the memory buffer and starts to recycle from a first existing buffer block.

6. The data system according to claim 5, wherein in response to a count value for a buffer block to be recycled being 0, the file system in user space recycles the buffer block to be recycled, wherein in response to the count value for the buffer block to be recycled not being 0, the file system in user space suspends the recycling of the buffer block to be recycled, wherein the count value for the buffer block to be recycled is determined based on a number of reading operations that currently read the buffer block to be recycled.

7. The data system according to claim 1, wherein a number of a plurality of buffer blocks built by the file system in user space based on the target file has an upper limit of number, and/or a total buffer size of the plurality of buffer blocks has an upper limit of buffer size.

8. The data system according to claim 1, wherein the file system in user space receives another reading request sent by another application end, and the file system in user space uses the at least one buffer block based on the reading request.

9. The data system according to claim 1, wherein in response to the file system in user space receiving a first-time reading request sent by the application end, based on the first-time reading request, the file system in user space pre-stores file data of an initial part of the target file in a first buffer block of the memory buffer and pre-stores file data of a final part of the target file in an additional buffer block of the memory buffer.

10. A data reading method executed by an electronic processor in combination with a non-cache memory circuit, the method, comprising:

receiving, by a file system in user space, a reading request sent by an application end;

reading, by the file system in user space and based on the reading request, prefetch data of a target file pre-stored in at least one buffer block of a memory buffer;

determining, by the file system in user space, that a total amount of data read from a last buffer block combined with stored data from the at least one buffer block being currently read exceeds a preset total amount; and in response to the file system in user space determining that the total amount of data read from the last buffer block combined with stored data from the at least one buffer block being currently read exceeds the preset total amount, prefetching, by the file system in user space, a next batch of prefetch data of the target file from a storage device, and storing the next batch of prefetch data in another buffer block of the memory buffer;

wherein sizes of buffer blocks included in at least one initially built portion of a plurality of buffer blocks built by the file system in user space based on the target file sequentially increase.

11. The data reading method according to claim 10, wherein the preset total amount is half of a buffer size of the last buffer block with stored data from the at least one buffer block.

12. The data reading method according to claim 10, wherein the prefetch data and the next batch of prefetch data are sequential data.

13. The data reading method according to claim 10, wherein the sizes of buffer blocks included in the at least an initially built portion of the plurality of buffer blocks built by the file system in user space based on the target file sequentially increase by an arithmetic progression.

14. The data reading method according to claim 10, further comprising:

in response to the file system in user space having prefetched the next batch of prefetch data of the target file from the storage device, and a number of a plurality of buffer blocks built by the file system in user space based on the target file having reached an upper limit, adding, by the file system in user space, a new buffer block in the memory buffer and starting recycling from a first existing buffer block.

15. The data reading method according to claim 14, wherein recycling the buffer block comprising:

in response to a count value for a buffer block to be recycled being 0, recycling, by the file system in user space, the buffer block to be recycled, in response to the count value for the buffer block to be recycled not being 0, suspending, by the file system in user space, the recycling of the buffer block to be recycled, wherein the count value for the buffer block to be recycled is determined based on a number of reading operations for currently reading the buffer block to be recycled.

16. The data reading method according to claim 10, wherein a number of a plurality of buffer blocks built by the file system in user space based on the target file has an upper limit of number, and/or a total buffer size of the plurality of buffer blocks has an upper limit of buffer size.

17. The data reading method according to claim 10, further comprising:

receiving, by the file system in user space, another reading request sent by another application end, and using, by the file system in user space, the at least one buffer block based on the another reading request in a same manner as based on the reading request.

18. The data reading method according to claim 10, further comprising:

in response to the file system in user space receiving a first-time reading request sent by the application end, based on the first-time reading request, the file system in user space pre-stores file data of an initial part of the target file in a first buffer block of the memory buffer and pre-stores file data of a final part of the target file in an additional buffer block of the memory buffer.

* * * * *